(12) United States Patent
Modani (10) Patent No.: US 8,395,622 B2
(45) Date of Patent: Mar. 12, 2013

(54) METHOD FOR ENUMERATING CLIQUES (75) Inventor: Natwar Modani, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 1296 days.

(21) Appl. No.: 12/141,219

(22) Filed: Jun. 18, 2008

(65) Prior Publication Data

US 2009/0315890 A1 Dec. 24, 2009

(51) Int. Cl.
G06T 11/20 (2006.01)
G06F 15/16 (2006.01)

(52) U.S. Cl. .................. 345/440; 709/200; 370/254
(58) Field of Classification Search .............. 345/440; 370/254; 709/200
See application file for complete search history.

(56) References Cited

U.S. PATENT DOCUMENTS

| 5,706,503 | A | 1/1998 | Poppen et al. | |
|---|---|---|---|---|
| 7,933,915 | B2* | 4/2011 | Singh et al. | 707/760 |
| 2005/0027780 | A1 | 2/2005 | Pai | |
| 2007/0196020 | A1* | 8/2007 | Fasulo | 382/225 |
| 2007/0239694 | A1* | 10/2007 | Singh et al. | 707/3 |

OTHER PUBLICATIONS

Pei et al., On Mining Cross-Graph Quasi-Cliques, pp. 228-238, ACM, Aug. 21-24, 2005.*
Abello et al., Massive quasi-clique detection, Latin American Theoretical Informatics, pp. 598{612, 2002.
Akkoyunlu, The Enumeration of Maximal Cliques of Large Graphs, SIAM Journal of Computing, 2(1):1{6, Mar. 1973.
Alba, A Graph-theoritic Definition of a Sociometric Clique, Journal of Mathematical Sociology, 3:113{126,1973.
Clauset et al., Finding Community Structure in Very Large Networks, Phys. Rev., E 70 (066111), 2004.
Girvan et al., Community Structure in Social and Biological Networks, Proc. Natl. Acad. Sci, USA 99(7821), 1973.
Hanneman et al., Introduction to Social Network Methods, University of California, Riverside, Riverside, CA, 2005.
Loukakis et al., A Depth First Search Algorithm to Generate the Family of Maximal Independent sets of Graph Lexicographically, Computing by Springer-Verlog, 27:349{366, 1981.
Makino et al., New Algorithm for Enumerating all Maximal Cliques, SWAT, pp. 668{679, 2004.
Mulligan et al., Corrections to Bierstone's Algorithm for Generating Cliques, Journal of the Assoc. for Computing Machinery, 19:244{247, 1972.
Osteen et al., A Clique-detection Algorithm Based on Neighbourhoods in Graph. Intl. Journal of Computer and Information Science, 2(4):257{268, 1973.
Tsukiyama et al., A New Algorithm for Generating all the Maximal Independent Sets. SIAM Journal of Computing, 6(3):505{517, Sep. 1977.
Watts et al., Collective Dynamics of 'Small World' Networks, Natures, 393:440{442, Jun. 1998.
Maximal Claque Enumeration Problem (http://www.cs.utk.edu/~yzhang/ce/).
Backstrom et al., Group Formation in Large Social Networks: Membership, Growth, and Evolution, KDD'06, August.

(Continued)

Primary Examiner — M Good Johnson
(74) Attorney, Agent, or Firm — Ryan, Mason & Lewis, LLP (57) ABSTRACT

Techniques for enumerating at least one maximal clique are provided. The techniques include obtaining data, wherein the data comprises a graph, obtaining a user-specified minimum size restriction on at least one maximal clique of interest, filtering the data using the user-specified minimum size restriction to reduce graph size, and enumerating at least one maximal clique from the graph provided that at least one maximal clique exists above the user-specified minimum size restriction.

17 Claims, 2 Drawing Sheets

MAXIMAL CLIQUES:
ABCD, CEF

NEIGHBORHOOD LISTS:
A: ABCD
B: ABCD
C: ABCDEF
D: ABCDG
E: CEF
F: CEFG
G: DFG

• C -> ABCDEF
• D -> {ABCD, ABCEF, ABDG}
• A -> {{ABCD}, {ABC, BCEF},
  {ABD, BDG}}=>(DEDUP, MAXIMAL)
  {ABCD, BCEF, BDG}
• B -> {{ABCD}, {CEF}, {}} =>
  {ABCD, CEF}
• F -> {{ABCD}, {CEF},
  EFG} => {ABCD, CEF, EFG}
• E -> {{ABCD}, {CEF},
  {}} => {ABCD, CEF}
• G -> {{ABCD},
  {CEF}} => {ABCD, CEF}

OTHER PUBLICATIONS

Charikar, Greedy Approximation Algorithms for Finding Dense Components in a Graph, APPROX, pp. 84-95, 2000.

Kumar et al., Structure and Evolution of Online Social Networks, KDD'06, August.

Newman, Assortative Mixing in Networks, Phys. Rev. Lett., 89:208701, May 2002.

Finding a Large Hidden Clique in a Random Graph, http://www.math.princeton.edu/~bsudakov/hidden-clique.pdf.

\* cited by examiner

FIG. 1

MAXIMAL CLIQUES:
ABCD, CEF

NEIGHBORHOOD
LISTS:
A: ABCD
B: ABCD
C: ABCDEF
D: ABCDG
E: CEF
F: CEFG
G: DFG

- C -> ABCDEF
- D -> {ABCD, ABCEF, ABDG}
- A -> {{ABCD}, {ABC, BCEF}, {ABD, BDG}}=>(DEDUP, MAXIMAL) {ABCD, BCEF, BDG}
- B -> {{ABCD}, {CEF}, {}} => {ABCD, CEF}
- F -> {{ABCD}, {CEF}, EFG} => {ABCD, CEF, EFG}
- E -> {{ABCD}, {CEF}, {}} => {ABCD, CEF}
- G -> {{ABCD}, {CEF}} => {ABCD, CEF}

METHOD FOR ENUMERATING CLIQUES

FIELD OF THE INVENTION

The present invention generally relates to information technology, and, more particularly, to clique enumeration.

BACKGROUND OF THE INVENTION

Finding communities is a fundamental problem in social network analysis. Various definitions have been proposed for communities in a social network. One type of community in any social network is where every member of the group knows every other member of the group. If one thinks of a person in the social network as a vertex and a relation between two persons (knows) as an edge, then a social network can be viewed as a graph. Social networks where the relation is bidirectional (that is, if a knows b, then b also knows a) and between any pair of people there can be at most one relation would result in a simple undirected graph describing the social network. One can think of the communities mentioned above as cliques in the graph which describes the social network. Usually, one would be interested only in maximal cliques.

One of the natural social networks is formed by calling patterns of people. It is very interesting for the telecom service providers to understand the communities in the social network formed by their users. This understanding can help improve the effectiveness of campaigns, help identify potential churners by looking at the communities that the past churners were a part of, identify potential conversion targets by finding people not in their network but part of communities in their network, and to understand the spreading of value added-services based on the social network structure.

Telecom service providers have call detail records (CDRs) for all the calls originating from or terminating in their network. The telecom service provides can analyze these CDRs to identify the social network as a graph by treating people as vertices and calls between people as edges. When the social network is derived from a telecom network, the cliques can be useful for identifying targets for campaigns. However, in such situations, the information content of small maximal cliques is low and the number of small maximal cliques in a social network graph is very large. Therefore, the relative gain of finding such small maximal cliques is very low. As such, it is of interest to find only the large maximal cliques in the social networks.

Existing approaches to maximal clique enumeration include attempts to provide a run-time that is guaranteed to be polynomial in output size, as well as trading this guarantee for fast running time for practical problems. The output polynomial approaches are based on augmentation of a clique in such a manner that one would avoid going in the direction of a non-maximal clique. Therefore, it is hard to know if a clique under construction is likely to have the required minimum size until very late in the process. Because of this nature, it is difficult to exploit the constraint that the maximal clique needs to be large very effectively. Some other existing approaches are based on starting with a large size vertex set and then pruning it to a maximal clique in an iterative or recursive fashion. Here, one has an estimation of the largest maximal clique that one can find from such a set (the size of the set itself) and hence can exploit the size constraint readily.

As noted above, finding large maximal cliques in a very large graph is a problem of fundamental importance. Existing approaches can include, for example, finding a maximum clique in the graph, as well as attempting to enumerate all maximal cliques.

An approach to find a maximum clique in a graph is not suitable for all situation where one needs to find all large maximal cliques (for example, in telecom, the closed user groups are cliques, and one would need to find all large closed user groups (CUG), not just one of them.

Also, in very large scale integration (VLSI), cliques represent fully interconnected components). Also, an approach attempting to enumerate all maximal cliques is usually very slow and finds all maximal cliques, some of them are too small to be of much use. Also, such an approach is usually limited in the size of graph that can be handled as well as being slow.

In telecom, if people are considered vertices and calls and/or short message service (SMS) between them are considered edges, then the problem of finding CUGs can be considered a clique detection problem. Existing approaches can include, for example, attempting to find a maximum clique by calculating a connectivity count for each vertex and removing the vertices systematically to obtain, for example, a maximum clique. However, such approaches do not enumerate all maximal cliques.

Also, an existing approach can includes clustering multi-dimensional related data in a computer database by combining the two vertices of a graph connected by an edge having the highest score. However, such an approach disadvantageously uses weight assigned to an edge that is not based on the extent of overlap in the neighborhoods of the vertices in question.

Clustering coefficients (that is, the ratio of number of triangles in the immediate neighborhood of the node divided by the number of possible triangles based on the degree of the vertex) are disadvantageous, as described below, for the purpose of clique enumeration. They cannot be used to filter the graph meaningfully while not affecting any interesting maximal cliques. Consider, for example, one is looking for maximal cliques of size 10 and above. Now, assume that a node has degree 100 and participates in a clique of size 10, but all of its other 90 neighbors are not connected to each other. In such situations, the clustering coefficient of the node will be low, but it participates in the maximal clique of desired size. On the other hand, there may be nodes which do not participate in the desired clique size but have a high clustering coefficient. Hence, one cannot use the clustering coefficients meaningfully to reduce the graph size.

Cliques can sometimes be too restrictive a definition for communities in social networks. Clique relaxations have been proposed in existing approaches such as, for example, quasi-cliques, k-cores, k-cliques, k-club and k-plex. Quasi cliques can be defined as a group of vertices such that the ratio of the number of edges in the sub-graph to the number of edges in a clique of the same size is above a user supplied parameter.

A group of vertices can be called a k-core if the degree of each node in the group is at least k in the sub-graph induced by this group of vertices. Although finding the densest sub-graph is a difficult problem, an approximation within a factor of two is more easily found. Finding k-cores is also straightforward. However, neither of these definitions provides any guarantee about the cohesiveness and tightness of the communities (in terms of diameter of the graph) and, hence, is not favored for community definition in social networks.

In an existing approach, for example, k-cliques is defined as a group of vertices such that there exists a shortest path between any pair of vertices in the group which is no more than k in length in the full graph. This indicates that some of the nodes that may be in the shortest path between a pair of vertices from the group may not belong to the same group. When the diameter of the induced sub-graph is k (that is, when there exists a shortest path between any pair of nodes of length $\leq$k in the sub-graph induced by the vertex set) then it is called as k-club.

As such, all k-clubs are k-cliques, but all k-cliques are not k-clubs. While k-club definition guarantees a small diameter of the community, it is still not cohesive, as deletion of a few nodes may change the community characteristics dramatically. Another clique relaxation includes k-plex, where each member of the community is connected to all others in the community except k members. This definition guarantees a small diameter, etc., but finding such communities is difficult.

Finding social networks on Internet based online groups has been a topic of research interest. One existing approach explores online repositories of real-life social networking data to find different characteristics of real-life social networks. Existing approaches also include investigating formation, membership, growth and evolution of large social networks.

SUMMARY OF THE INVENTION

Principles of the present invention provide techniques for enumerating cliques. An exemplary method (which may be computer-implemented) for enumerating at least one maximal clique, according to one aspect of the invention, can include steps of obtaining data, wherein the data comprises a graph, obtaining a user-specified minimum size restriction on at least one maximal clique of interest, filtering the data using the user-specified minimum size restriction to reduce graph size, and enumerating at least one maximal clique from the graph provided that at least one maximal clique exists above the user-specified minimum size restriction.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include enumerating large maximal cliques. As described herein, one or more embodiments of the invention include a filtering technique termed as peeling to reduce a graph size before attempting clique enumeration. Vertices of small degree can be removed to reduce the graph size. Also, principles of the present invention include a variation of the same technique to handle even larger graphs. Also, one or more embodiments of the present invention include a novel clique enumeration algorithm that is especially suitable for large maximal clique enumeration.

As detailed above, identifying communities in a social network is a problem of great interest. One popular type of community is where every member of the community knows all others, which can be viewed as a clique in the graph representing the social network. In several real life situations, finding very small cliques may not be interesting as they are large in number and low in information content. As such, principles of the present invention include a preprocessing technique to reduce the graph size before enumerating the large maximal cliques. Also, the techniques described herein include a maximal clique enumeration algorithm that exploits the constraint on minimum size of the desired maximal cliques by introducing a minimum clique size criterion. Principles of the invention include a preprocessing technique that exploits the desired minimum clique size and the extent of overlap in the neighborhood of adjacent vertices to filter the graph before performing the maximal clique enumeration. Also, one or more embodiments of the present invention include a novel clique enumeration algorithm that is especially suitable for large maximal clique enumeration.

The techniques described herein can be suited, for example, for sparse graphs. One or more embodiments of the invention include filtering criterion that uses the observation that if the two vertices on the two ends of an edge are to be in the same clique (of size at least L), then they must share at least L vertices in their respective neighborhoods. Also, if a vertex is to participate in a clique of size at least L, it must share at least L neighbors with at least L−1 of its neighbors. A clique finding algorithm attaches conditions to every candidate that must be satisfied in order for it to be a large maximal clique. These conditions allow one to reuse computations performed at one stage to all further stages by successively refining the criteria for the candidate to be a maximal clique, and thereby improving the run time of the algorithm. Also, the execution behavior of such an algorithm does not depend heavily on the presence of a few nodes with large degree.

In contrast to the disadvantageous existing approaches noted above, one or more embodiments of the present invention include a user specified minimum size restriction and use the extent of overlap in the neighborhood of vertices as a basis for filtering the graph prior to performing maximal clique enumeration. The techniques described herein detect all maximal cliques of size n (a user supplied parameter) and more in a given undirected graph. A graph can be filtered to reduce the size without discarding vertices and edges that may participate in cliques of size n and above. Also, the maximal cliques of size n and above can be found in the (filtered) graph.

For example, degree-based filtering includes removing all nodes which have a degree less than n−1. While removing the node, one can also remove it from other adjacency lists wherever it occurs. This can be done recursively if one removed something in current iteration. Also, SNN filtering includes the concept of the shared nearest neighbors (SNN) degree of an edge. For a pair of nodes A and B, one can assign a number called the shared nearest neighbor degree to be calculated as follows.

$$NN(A,B)=\text{Size}\{N(A)\text{Intersection }N(B)\},$$

where N(A) is the 1-hop neighborhood of A.

There can be two possible definitions of N(A), as it may or may not include A. One or more embodiments of the invention choose the definition where A is included in N(A).

As described herein, a filtered adjacency list can be used to speed up clique detection using SNN degree of nodes (for example, such an aspect is useful if one is interested in larger cliques only). If an edge participates in a clique of size n, then the SNN-degree of the edge will be at least n. If a node participates in a clique of size n, then it must have at least n−1 edges with a SNN degree n incident on it. As such, these are stricter conditions than degree (that is, that a node must have degree n−1 or more to participate in a clique of size n).

By way of example, assume that there exists one or more new neighborhood list, say N(A), of node A. For each candidate, one can remove the candidate from the candidate list. If A is in the candidate, one can create a new candidate with only the intersection of N(A) and the candidate in question. If intersection≠candidate, one can create a new candidate by removing A from the candidate under consideration. If intersection≠N(A), one can create a candidate by removing the nodes already considered from the N(A), but do it once only in an iteration and only if this condition was never meet in this iteration. If A is not ever in the list of neighbors and none of its neighbors have been processed yet, one can add A's neighborhood list as a candidate. Whenever inserting a new candidate, one can ensure that no other candidate exists which is a superset of the new candidate.

Figure 1:
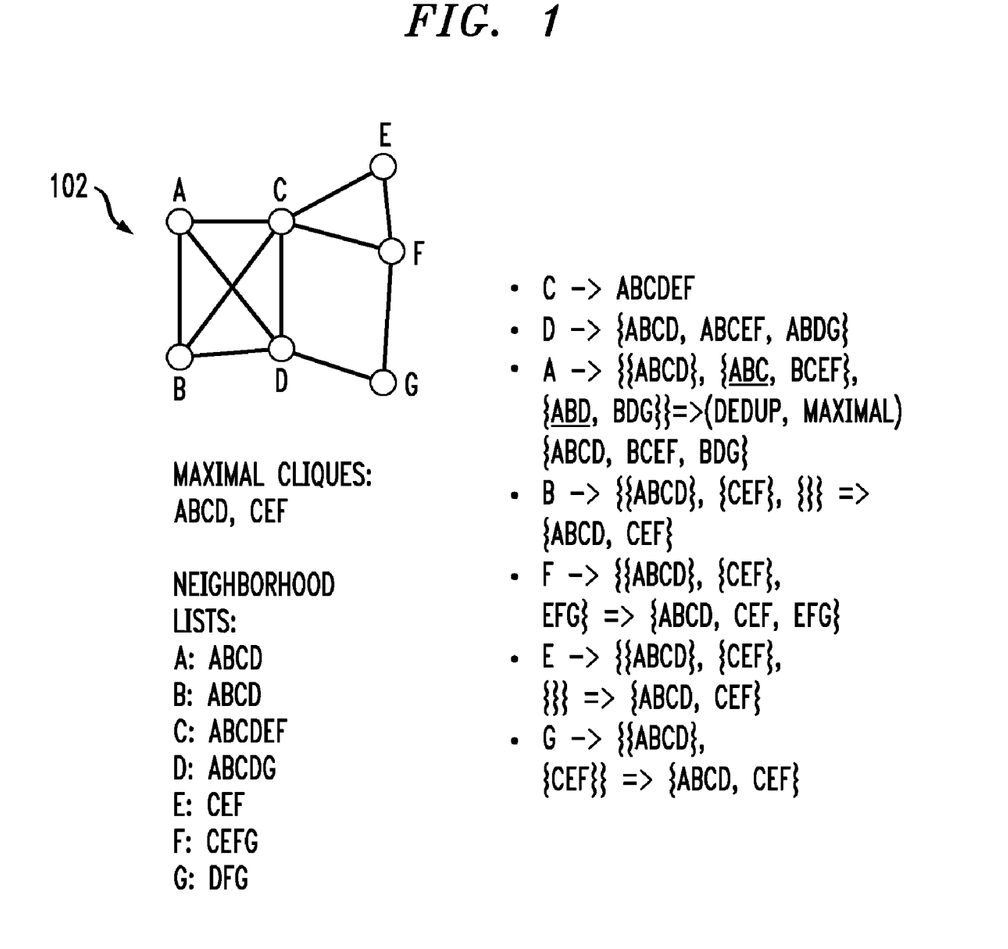
FIG. 1 is a diagram illustrating an exemplary approach for cliques, according to an embodiment of the present invention.

FIG. 1 is a diagram illustrating an exemplary approach for cliques 102, according to an embodiment of the present invention. By way of illustration, FIG. 1 depicts an example of finding maximal cliques of a size of at least three using a simple large maximal clique enumeration algorithm described herein.

As described herein, principles of the present invention include techniques where a user can specify the minimum desired size of the maximal cliques. One or more embodiments of the invention exploit the minimum desired size to dramatically improve the run-time of a clique finding algorithm. Additionally, an adjacency list is not required to be loaded into the memory and, consequently, one can process a much larger graph (for example, graphs with more than 7.7 million vertices and 37 million edges of real world data) and find cliques very quickly (for example, in this graph, all cliques of size 17 and above were found in less than 6.5 minutes).

The algorithm to find maximal cliques can process the adjacency list arriving in a random order and does not need to store it after processing it once. Therefore, the memory requirement is fairly low. The techniques are based on finding the sets which may be a superset of a maximal clique based on the adjacency lists inspected as yet. In contrast to the disadvantageous existing approaches detailed above, principles of the present invention include a user-specified minimum desired clique size of maximal clique for determining maximal clique enumeration.

By way of illustration, let G=(V,E) be a simple undirected graph, where V is the set of vertices and E is the set of edges. Let K be a subset of vertices V, and K is called a clique if ∀u, v∈K, (u, v)∈E. Further, if there is no set K'⊂V such that K' is a clique and K⊂K' then K is called as a maximal clique. One can denote the size of a set of vertices K by |K|. Also, let the user specify a threshold L such that the user is interested only in the maximal cliques K that have a size |K|≧L.

With respect to large maximal clique enumeration, given a simple undirected graph G(V,E), one can enumerate all maximal cliques of size at least L. One can also denote the neighborhood of a node v as Γ(v), defined as:

$$\Gamma(v) = \{v\} \cup \{u : (u,v) \in E\} \quad (1)$$

Also, one can define $\delta(v) = |\Gamma(v)|$ and $\delta_{max} = \max_{v \in V} \delta(v)$. The number of nodes with neighborhood size $\delta$ can be denoted as $n_\delta$. Further, $\Sigma_\delta n_\delta = |V|$ and $\Sigma_\delta (\delta-1) \ast n_\delta = 2\ast|E|$. Also, another quantity $\Delta$ can be defined as $\Delta = \max(\delta)$ such that $n_\delta \geq \delta$. The significance of $\Delta$ is that it is the largest maximal clique size that can be supported by a graph with the given degree distribution. It can also be used in the complexity result.

As noted above, one or more embodiments of the invention include an algorithm to detect large maximal cliques in a very large graph. The computational effort required to find the maximal cliques increases very quickly with the graph size, and therefore an algorithm as described herein first attempts to filter the graph to reduce the graph size. This goal can be achieved based on the threshold parameter supplied by the user. As described herein, one or more embodiments of the invention include trying to reduce the graph size without loading the entire graph in main memory. Additionally, another level of filtering can be applied on the filtered graph obtained from the first phase, which reduces the graph size further. On this smaller graph, one can enumerate the large maximal cliques. Note, however, that the preprocessing and clique enumeration algorithm can be used independent of each other.

The first part of an exemplary algorithm can use a simple observation that a node v∈V cannot participate in a clique of size L unless $|\Gamma(v)| \geq L$. Once the nodes that do to not satisfy the neighborhood size criterion are dropped, one may have some new vertices that may have satisfied the criterion earlier, but do not satisfy it anymore. Consequently, one may apply this criteria recursively on the resulting graph as long as one drops some nodes from the graph. This procedure is described herein as degree based filtering.

As such, one or more embodiments of the present invention can include a degree based filtering algorithm such as, for example, illustrated as follows.

```
DegreeBasedFilter (infile, outfile, L, D_p)}
    init D_c = ∅
    (∀υ∈V){
        read a node υ and its neighbourhood Γ (υ) from the infile,
        if (|γ(υ)| < L) then D_c = D_c ∪ {υ}
        else write υ, γ(υ) to outfile
    }
    // if a node was dropped in this iteration make a
    // recursive call with input and output files switched
    if (D_c ≠ ∅)
        DegreeBasedFilter(outfile, infile, L, D_c)
```

Sometimes the input graph may be too big to hold the memory in order to perform the degree based filtering. As such, one or more embodiments of the present invention include a recursive scheme which will require at most $|V|+\delta$ max amount of random access memory to perform the degree based filtering. One can assume, for example, that the input graph is given in the form of neighborhood list (that is, each row in the input represents a node and all its neighbors including v itself).

Let Dp denote the set of vertices dropped in a previous iteration and Dc denote the set of vertices dropped in the current iteration. The first call to the degree-based filtering routine is made with Dp=Φ. The algorithm can be presented in the degree-based filtering algorithm above. Also, with respect to the algorithm, note that it takes no more than $|V|+\delta$ max amount of main memory (at most $|V|$ amount of memory to hold the dropped vertices, and at most $\delta$ max to hold the neighborhood of a vertex while processing it) irrespective of $|E|$. One needs to keep track of the nodes dropped in an iteration only for two iterations. Therefore, the memory requirement is even less. Further, each vertex in the filtered graph has a minimum neighborhood size of L in the filtered graph.

This technique is a variant of the well-known practice to find a dense sub-graph. As described herein, the technique has been modified to not load the entire graph in memory. As described above, one or more embodiments of the present invention include a shared neighborhood filtering algorithm such as, for example, as follows.

```
DegreeBasedFilter (infile, outfile, L, D_p){
    initialize D_e = D_υ = φ
    (∀υ∈V){
        ∀u∈ Γ (υ){
            if (|Γ(υ)∩Γ(u)|<L){
                E=E - {(u,υ)}
                D_e = D_e ∪ {(u,υ)}
            }
        }
        if(|Γ(υ)|< L)
            V = V - υ
            E = E - {(w,υ)} ∀w∈Γ(υ)
            D_u = D_u ∪ {u}
            D_e= D_e ∪ {(w,υ)} ∀w∈Γ(υ)
        }
        if (D_e ≠ ø or D_u ≠ ø)
            SharedNeighboursFilter (G (V, E), L)
```

The next step in the algorithm can be to filter the graph further based on novel criteria. Also, in order for an edge e=(u, v) to participate in a clique of size L, the nodes on the two sides of the edge u, v must share at least L neighbors in their neighborhood. That is, for any K, a clique of size $\geq$L, u, v$\in$K)/|Γ(u)∩Γ(v)|$\geq$L. Furthermore, if a vertex v is to participate in a clique of size $\geq$L, it must have at least L-1 neighbors u, such that |Γ(v)∩Γ(u)|$\geq$L. These criteria are used to eliminate edges and to eliminate the vertices which cannot participate in a clique of size at least L. The shared neighborhood filtering algorithm above illustrates the algorithm for the same.

This is a far stricter criterion than the degree-based filtering, and results in significant reduction in the graph size. Another point to note is that while the degree-based filtering results in an induced sub-graph of the remaining vertices, in shared neighborhood filtering, some of the edges between the surviving nodes may also be dropped if they cannot participate in the same maximal clique.

As also described herein, one or more embodiments of the invention include an algorithm to find all maximal cliques at least L in size. As such, expected is a potentially very large but fairly sparse graph and a modest number of large maximal cliques. This allows one to use breadth-first search tactics as against the depth-first technique used in some of the existing approaches. Also, one can assume the input graph to be in the form of a neighborhood list, and process these neighborhood lists one by one. An algorithm such as described herein does not presume any specific ordering of node arrival.

By way of example, consider any given clique. Since all vertices within a clique must have an edge between them, a clique, therefore, is a subset of neighborhoods of the member nodes. Thus, one can start with the neighborhood of a node, say v, as a candidate for being a clique. Consider another node u which is a neighbor of v. If both of them participate in a clique, then the clique will be a subset of the intersection of the neighborhoods of u and v.

On the other hand, a clique may only contain v and not u, or vice versa. One needs to identify cliques of all three types while processing the vertices. If one is interested in only maximal cliques, then he or she needs to ensure that only those groups of vertices that may lead to maximal cliques of desired minimum size are retained for further processing.

Objects called MaximalCliqueCandidates (candidate, for short) are created which are denoted by c, and the set of all c's is denoted by C. The candidate c can include confirmed node set Fc and alive node set Ac. One can attach two more sets of nodes called dropped nodes Dc and killed nodes Kc to each candidate for convenience, though the algorithm does not process them and, hence, they do not play a part in the actual implementation of the algorithm. Each node that has been processed will be in exactly one of three sets, Fc, Dc or Kc. The Fc, which can be referred to as confirmed nodes, is a subset of nodes which have been processed already and form a clique amongst themselves. The nodes in Kc, referred to as killed nodes, are those that were not a neighbor of at least one of the nodes in the Fc that arrived before the node in question. The set Dc, referred to as dropped nodes, includes nodes that are not included in the candidate by choice. One can also define a set U as the set of nodes already processed.

Consider a node v and a candidate c. Suppose v∈c. There are three possibilities. A given maximal clique (which contains Fc) will either contain v, or it will not contain v. The third possibility is that Γ(v) contains a maximal clique that does not include any of the nodes that have been processed up to now. Hence, one can create two candidates from each candidate that contains the node in question, one which contains the node and the other which does not. In the first case, one can drop the nodes from Ac that are not in the neighborhood of v. To cover the third possibility (Γ(v) contains a clique K, such that K∩U=φ), one can create a new candidate Γ(v)−U. As described herein, if a candidate is a subset of another candidate, it cannot lead to a maximal clique which will not be found otherwise. Consequently, candidates are only kept that are maximal.

When U=V, the candidates are the set of maximal cliques. An exemplary algorithm is presented in the simple large maximal clique enumeration algorithm below.

```
findLargeMaximalCliqueSimple (G (V, E), L) {
    init C = ø,U = ø)
    ∀υ∈V{
        ∀c∈C{
            if (υ ∈ A_c){
                C = C - c
                // Create the candidate with intersection of
                   c and Γ(υ)
                create a new candidate c̄ with F_c̄ =F_c ∪ {υ}
                    A_c̄ =(A_c - {υ}) ∩ Γ (υ) and insert it into
                    C if its F ∪ A is not a subset of F ∪ A of
                    another candidate is C.
                // Create the candidate with c without the
                   new vertex υ
                if(c ≠ c̄){
                    create a new candidate c̄ as follows
                    F_c̄ =F_c1 A_c =A_c - {υ} and insert it into
                        C if its F ∪ A is not a subset of F ∪ A
                        of another candidate in C.
                }
                // Create the candidate with Γ(υ) without
                   the vertices already considered
                if(Γ (υ) ≠ c̄ ){
                    create a new candidate c̄ as follows
```

```
        F_c^- = {v}, A_c = Γ(v) - {v}}- U and insert
        it into C if its F U A is not a subset of
        F U A of another candidate in C and
        only if it has not been done before in
        this iteration.
      }
    }
  }
  if (v is not the candidates ever, and none of its
      neighbours have been processed yet){
      create a new candidate c̄ as F_c^- = v, A_c = Γ(v) -
          {v} and add it to C.
  }
 }
}
```

The algorithm above finds all the maximal cliques that are at least L in size. However, it has to perform a check on a candidate, whether it is a subset of any other candidate before inserting the candidate in C. This is a costly operation, and as the number of candidates grows, the algorithm can slow down significantly. Motivated by the need to remove the check of superset existence, the following observation can be made to test if a given candidate can give rise to maximal clique. Exactly one of the two conditions will be satisfied by any given maximal clique K: V∈K; or ∃u:u∈K and u∉Γ(v).

It is easy to see that if both are true, then K will not be a clique, and if both are false, K will not be maximal. As such, whenever a node is dropped, if at least one of the vertices that are not neighbors of the dropped node remains alive, then there is a chance for the candidate to evolve in to a maximal clique. Once all of the nodes are dropped (or killed) that were not neighbors of a node that one chose to drop, the candidate cannot give rise to a maximal clique. To exploit this observation, one can attach a taboo list to a candidate from which one can drop a vertex. This taboo list can include the set of vertices that are alive and not neighbors of the node dropped (that is, a subset of alive nodes). Every time one includes a node from A in to F, one may kill some vertices in A. They can be dropped from the taboo lists as well.

On the other hand, if the vertex that is included from A to F is a member of the taboo list, then the taboo list is satisfied and one can discard that taboo list. Similarly, when one chooses to drop a node, one can again remove that vertex from the taboo lists for the candidate. If at any stage, any of the taboo lists for a given candidate become empty, then one can drop the candidate, as it cannot lead to a maximal clique. Also, if a taboo list is so large that none of its members are in the candidate, then the candidate will become smaller than the desired size L, and this taboo list does not need to be kept.

One or more embodiments of the present invention can also include the large maximal clique enumeration algorithm seen below.

```
findLargeMaximalClique(graph G(V, E), size threshold L){
  init C = φ  U = φ
  (∀v∈V){
    // Create the candidate from Γ(v) without the vertices
    already considered
    create a new candidate c̄ as follows
    F_c^- = {v}, A_c^- = Γ(v) - {v}-U and attach taboo lists defined as
    for (∀w ∈ U ∩ Γ(v))
       create a taboo list λ_w = A_C^- - Γ(w)
    if (processCandidateTabooLists (c̄) = true) then C = C U {c̄}
    U = U U v
    (∀c∈ C){
      if (v∈A_c){
```

```
        C = C - {c}
        // Create the candidate with intersection of c and Γ(v)
        create a new candidate c̄ with:
        F_c^- = F_c U {v}, A_c^- = (A_c - {v}) ∩ Γ(v) and Λ_c^- =Λ_c
        if (processCandidateTabooLists (c̄) = true) then C = C U { c̄ }
        // Create the candidate from c without the new vertex v
        if(c ⊂ Γ(v)) {
           create a new candidate c with:
           F_c^- = F_c,A_c = A_c - {v} and Λ_c^- = Λ_c
           add a new taboo list λ = A_c - Γ(v)
           if (processCandidateTabooLists (c̄) = true) then C = C U {c̄}
        }
     }//end if v∈A_c
    }
   }
 }
}
processCandidateTabooLists (candidate c) {
  for each taboo list λ_i (c){
    λ_i(c){= λ_i (c) ∩ A_c
    if ((λ_i ∩ F_c ≠ ∅) OR (|λ_i| >|F_c^-| + |A_c^-| - L) OR (λ_i ⊃ λ_i))
       discard λ_i
    if ((|λ_i|=0)OR(|F_c U A_c^-| < L))
       return false //this candidate cannot lead to a
       maximal clique of size ≧ L
  }
  return true //this candidate may lead to a maximal clique of size ≧ L
}
```

The filtering schemes do not drop any edge or vertex that may participate in a maximal clique of desired size. Therefore, it does not affect the correctness of the overall approach. At the end of the algorithm, the candidate set C corresponds to the set of all maximal cliques of size at least L, and none of the maximal cliques of size at least L are missing from it.

By way of example, one can denote the confirmed and alive set together by the candidate name. That is, c would mean FcUAc. Note that if a vertex set K={k1, k2, . . . , kr} is a clique, then $K \subseteq \cap_{k_i \in K} \Gamma(k_i)$. If K is a maximal clique, then no other vertex can be a neighbor of all the vertices included in K, that is, $$K = \bigcap_{k_i \in K} \Gamma(k_i) = \bigcap_{k_i \in K} \Gamma(k_i) - (V - K)$$

Therefore, if K is a maximal clique, it will be of the form $K = \cap_{k_i \in K} \Gamma(k_i) - (V-K)$, and if $K = \cap_{k_i \in K} \Gamma(k_i) - (V-K) \neq \phi$, then K will be a clique.

Let U be the set of vertices processed up to now. As such, one can see that the candidates in the algorithm above are of the form $$c = \bigcap_{p \in P} I(p) - Q$$

where (P,Q) form a partition of U. Therefore, when U=V, each candidate will be a clique if it is not empty. Because one or more embodiments of the invention check for maximality explicitly, one would be discarding the non-maximal cliques. Thus, the output of the algorithm is a set of maximal cliques.

The techniques described herein do not miss any maximal clique of size ≧L. Note that the only candidates that are not being processed further are the ones that are subset of another candidate or smaller than the required size L. By doing that, one does not drop a candidate that can lead to a maximal clique that would otherwise not be covered.

Consider a candidate c1 such that it is a subset of another candidate c2. This implies that Fc1 ⊂ c2, but the vertices in Fc1 would be part of the confirmed part of c2, which in turn implies that Fc1 ⊂ Fc2 (because all members of c1 are in c2, and if a node which has been processed appears in a candidate, it is part of the confirm nodes, or else it would have been dropped or killed). Now consider a maximal clique K such that it could have been found by processing c1. As illustrated below, it can also be found by processing c2.

Because K can be derived from c1, K ⊃ Fc1 and K ⊂ Fc1∪Ac1, but Fc1∪Ac1=$\cap_{p \in F_{c1}}\Gamma(p)-(\overline{U-Fc1})$, and $\cap_{p \in F_{c1}}\Gamma(p) \subset \cap_{q \in F_{c2}}\Gamma(q)$ as observed earlier. This implies that K ⊂ $\cap_{p \in F_{c2}}\Gamma(p)-(U-Fc2)=Fc2\cup Ac2$ (since $(U-Fc1) \supset (U-\overline{Fc1})$). This implies that one would find K by processing c2 as well. Therefore, K will not be missing from the answer.

In one or more embodiments of the invention, the operations at each intermediate node are relatively inexpensive, but lead to a large number of leaf nodes that need to be checked against other leaf nodes to the left of them. Also, in order to check the maximality, one needs to keep all of the cliques found in memory in addition to the graph. As such, it is a memory intensive algorithm.

An existing approach may include taking a neighborhood and deciding to include or drop one vertex at a time to construct a clique. However, at each node, it checks if any of the dropped nodes can be brought back to extend this clique. Making this check ensures that if a candidate is leading to a non-maximal clique, one would be able to detect that soon and save the unnecessary computation. However, the processing at the intermediate nodes becomes more expensive. Also, one needs to keep checking at each intermediate node on one path for a node that is dropped. This disadvantageously leads to repetitive computation.

In one or more embodiments of the present invention, however, a binary decision forest (as against single decision binary tree in the approaches mentioned above) is constructed, and at each stage, one preferably makes sure that the user stops as soon as the user knows if the candidate will lead to a non-maximal clique. For this purpose, taboo lists (as described above) are maintained. One only needs to update the taboo lists in order to determine the maximality possibility. Here, the work done in one iteration is useful in all the nodes below it as well, as the taboo lists percolate down the tree.

The reduction in execution time can be somewhat accompanied by an increase in space requirement (as one needs to maintain the taboo list for each dropped node). However, as described herein, checks in the algorithm can reduce the amount of space taken by these lists. Also, if one is concerned with very sparse graphs (with, for example, a maximum degree of $\Delta$), the maximum amount of space one may need for a candidate's taboo lists is upper bounded by $(\Delta-L)^2$.

As described herein, one or more embodiments of the present invention include analyzing execution behavior of taboo list based algorithms, neighborhood based algorithms, and/or depth first search approaches. One or more of the algorithms can also be modified to incorporate a check for minimum size criterion at an appropriate place, and the DFS algorithm can also be modified for maximal clique enumeration rather than the maximal independent set enumeration.

As described herein, one or more embodiments of the present invention include a new variation of the maximal clique enumeration problem by introducing a constraint on the minimum size of the maximal cliques, a preprocessing technique to reduce the effective graph size and also a new large maximal clique enumeration algorithm. As illustrated above, filtering techniques reduce the graph size by several orders of magnitude and the large clique enumeration algorithm described herein outperforms the existing approaches.

As noted above, the seemingly daunting graphs sizes may be handled in very practical times (within minutes) to find the cliques. Consequently, it is advantageous to try and characterize the expected run-times of community finding algorithms based on graph properties.

Figure 2:
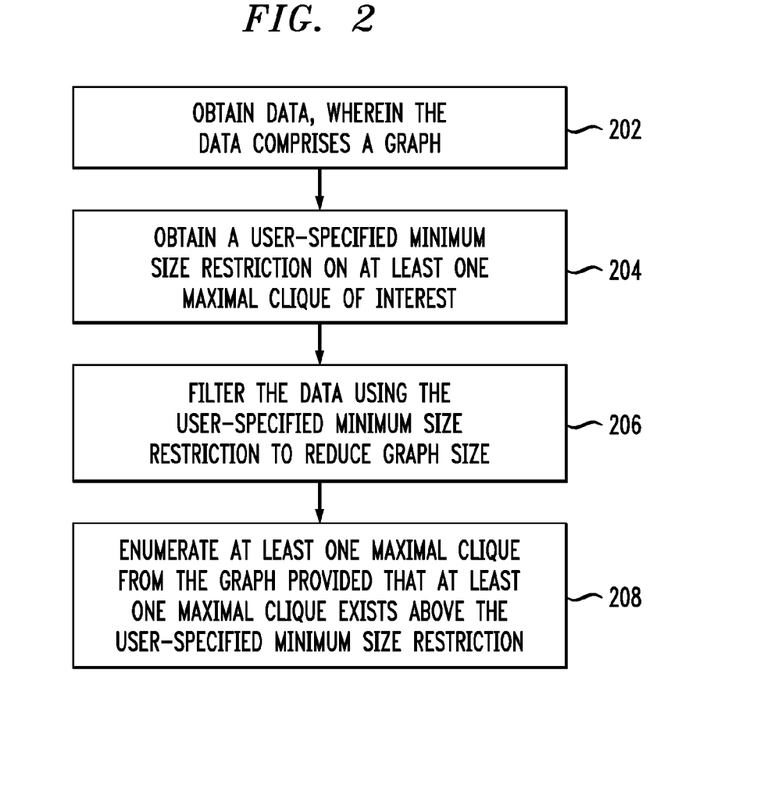
FIG. 2 is a flow diagram illustrating techniques for enumerating at least one maximal clique provided that at least one maximal clique exists above a user-specified minimum size restriction, according to an embodiment of the present invention.

FIG. 2 is a flow diagram illustrating techniques for enumerating at least one maximal clique (for example, at least one large maximal clique) provided that at least one maximal clique exists above a user-specified minimum size restriction, according to an embodiment of the present invention. Step 202 includes obtaining data, wherein the data comprises a graph. Obtaining data can include, for example, obtaining information related to at least one community from a social network. Step 204 includes obtaining a user-specified minimum size (for example, L) restriction on at least one maximal clique of interest.

Step 206 includes filtering the data using the user-specified minimum size restriction to reduce graph size. Filtering the data can include using degree-based filtering while loading less than an entire graph in memory to reduce the graph in size. Degree-based filtering can include the steps of keeping track of one or more nodes dropped in a current and a previous iteration, reading one vertex and all of its one or more neighbors (either one-by-one or together) at a time from a sequential access memory (for example, a file stored on a computer), determining whether each neighbor node was dropped in the current or previous iteration, wherein if a neighbor node was dropped, dropping it from a list of one or more neighbors, and determining a number of one or more surviving neighbors, wherein if there are fewer than L−1 surviving neighbors (not including the node itself), removing the node from consideration and adding it to a list (or set) of nodes dropped in the current iteration, and wherein if the number of one or more surviving neighbors is at least L−1 (not including the node itself), outputting the node and its neighbors to a sequential access memory (for example, a file to be stored on a computer), and wherein L is the user-specified minimum desired clique size. The determining steps can be repeated, for example, until no nodes are dropped in an iteration. Degree-based filtering can also include, for example, removing each of at least one node that has a degree of less than n−1, wherein n is a user-specified parameter.

Also, filtering the data can include using an extent of overlap in one or more neighborhoods of two vertices as a basis for filtering the data (referred to herein as shared neighborhood filtering or SNNFiltering) prior to enumerating at least one maximal clique to reduce the graph in size. Filtering the data via nearest neighbor-based filtering can include, for example, eliminating at least one edge and eliminating at least one vertex that cannot participate in a clique of a size of at least L, wherein L is a user-specified parameter. Additionally, using an extent of overlap in one or more neighborhoods of two vertices as a basis for filtering the data can include the steps of for each node, examining each edge incident thereon, counting a number of one or more nodes that are common in one or more neighborhoods of the two vertices joined by the edge, wherein if the number of such common neighbor nodes is at least L−2 (not including themselves), retaining the edge, else discarding the edge, after discarding the edges not having sufficient shared neighbors, determining a number of one or more surviving edges for a given node, wherein if the number of the one or more edges is less than L−1, discarding the node and each of one or more associated edges, else retaining the node and the one or more surviving edges. These steps can be repeated, for example, until at least one of no vertex and no edge is dropped in one full iteration over all of the one or more nodes.

Step 208 includes enumerating (for example, via use of an algorithm) at least one maximal clique from the graph provided that at least one maximal clique exists above the user-specified minimum size restriction. Using an algorithm to enumerate at least one large maximal clique from the graph can include, for example, performing a check to determine if a superset of candidate data exists in a candidate set.

The techniques depicted in FIG. 2 can also include attaching a taboo list to a candidate (that is, a set of vertices which may evolve into a maximal clique) for each vertex that is chosen to not be retained in the candidate (referred to herein as dropping a vertex), wherein attaching a taboo list facilitates determining if a candidate cannot give rise to a maximal clique. The taboo list can include a set of vertices such that if none of the vertices is retained in the candidate, the candidate cannot evolve into a maximal clique. The vertices are neighbors of each the nodes that are guaranteed to participate in a maximal clique arising from the candidate, and are not a neighbor of a node whose dropping led to creation of the taboo list.

A taboo list is considered to be fulfilled when one of the nodes in it is guaranteed to be included in a maximal clique arising from the candidate, and is discarded from further consideration to decide maximality of the candidate. The taboo list can be updated upon deciding to drop a node from the candidate to which the taboo list is attached, wherein updating includes removing the node from the taboo list. Also, a candidate is declared to be incapable of producing a maximal clique when a taboo list attached thereto becomes empty.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 3:
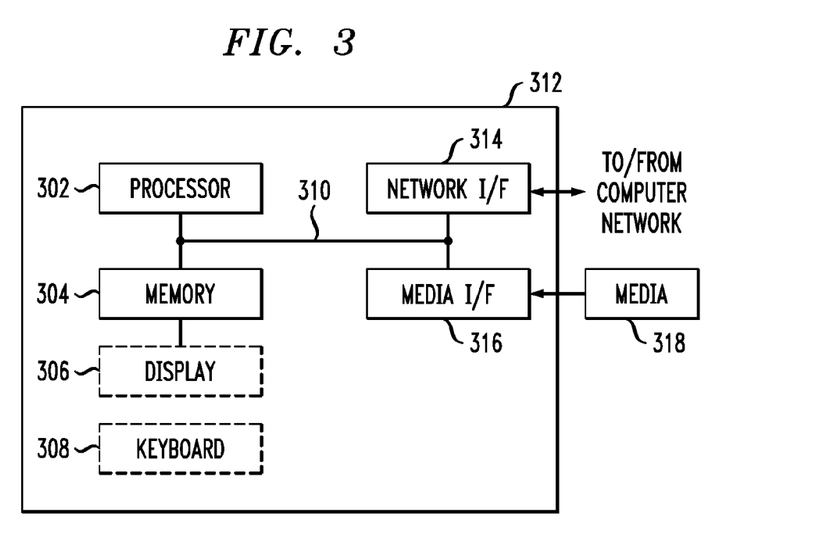
FIG. 3 is a system diagram of an exemplary computer system on which at least one embodiment of the present invention can be implemented.

At present, it is believed that the preferred implementation will make substantial use of software running on a general-purpose computer or workstation. With reference to FIG. 3, such an implementation might employ, for example, a processor 302, a memory 304, and an input and/or output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 302, memory 304, and input and/or output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 304), magnetic tape, a removable computer diskette (for example, media 318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, using a minimized desired size of clique to filter using the shared nearest neighbors and clique construction technique.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for enumerating at least one maximal clique, comprising the steps of:
    obtaining data, wherein the data comprises a graph;
    obtaining a user-specified minimum size restriction on at least one maximal clique of interest in the graph;
    filtering the data based on the user-specified minimum size restriction and an extent of overlap in one or more neighborhoods of two vertices joined by an edge to reduce graph size, wherein said filtering comprises counting a number of one or more nodes that are common in the one or more neighborhoods, and wherein if the number of such common neighbor nodes exceeds a specified number, retaining the edge, else discarding the edge; and
    enumerating at least one maximal clique from the graph provided that at least one maximal clique exists above the user-specified minimum size restriction.

2. The method of claim 1, wherein filtering the data comprises using degree-based filtering while loading less than an entire graph in memory to reduce the graph in size.

3. The method of claim 2, wherein degree-based filtering comprises the steps of:
    keeping track of one or more nodes dropped in a current and a previous iteration;
    reading one vertex and all of its one or more neighbors at a time from a sequential access memory;
    determining whether each neighbor node was dropped in the current or previous iteration, wherein if a neighbor node was dropped, dropping it from a list of one or more neighbors; and
    determining a number of one or more surviving neighbors, wherein if there are fewer than L−1 surviving neighbors, removing the node from consideration and adding it to a list of nodes dropped in the current iteration, and wherein if the number of one or more surviving neighbors is at least L−1, outputting the node and its neighbors to a sequential access memory, and wherein L is the user-specified minimum desired clique size.

4. The method of claim 3, wherein the determining steps are repeated until no nodes are dropped in an iteration.

5. The method of claim 1, wherein using an extent of overlap in one or more neighborhoods of two vertices as a basis for filtering the data comprises steps of:
    determining a number of one or more surviving edges for a given node, wherein if the number of the one or more edges is less than L−1, discarding the node and each of one or more associated edges, else retaining the node and the one or more surviving edges.

6. The method of claim 5, wherein the steps are repeated until at least one of no vertex and no edge is dropped in one full iteration over all of the one or more nodes.

7. The method of claim 1, further comprising attaching a taboo list to a candidate for each vertex that is chosen to not be retained in the candidate, wherein attaching a taboo list facilitates determining if a candidate cannot give rise to a maximal clique.

8. The method of claim 7, wherein the taboo list comprises a set of one or more vertices such that if none of the one or more vertices is retained in the candidate, the candidate cannot evolve into a maximal clique.

9. The method of claim 8, wherein the one or more vertices are neighbors of each the one or more nodes that are guaranteed to participate in a maximal clique arising from the candidate.

10. The method of claim 7, where the taboo list is considered to be fulfilled when one of the one or more nodes in it is guaranteed to be included in a maximal clique arising from the candidate, and is discarded from further consideration to decide maximality of the candidate.

11. The method of claim 7, where the taboo list is updated upon deciding to drop a node from the candidate to which the taboo list is attached, wherein updating comprises removing the node from the taboo list.

12. The method of claim 7, where the candidate is declared to be incapable of producing a maximal clique when a taboo list attached thereto becomes empty.

13. A computer program product comprising a tangible computer readable recordable storage medium having computer readable program code for enumerating at least one maximal clique, said computer program product including:
    computer readable program code for obtaining data, wherein the data comprises a graph;
    computer readable program code for obtaining a user-specified minimum size restriction on at least one maximal clique of interest in the graph;
    computer readable program code for filtering the data based on the user-specified minimum size restriction and an extent of overlap in one or more neighborhoods of two vertices joined by an edge to reduce graph size, wherein said filtering comprises counting a number of one or more nodes that are common in the one or more neighborhoods, and wherein if the number of such common neighbor nodes exceeds a specified number, retaining the edge, else discarding the edge; and
    computer readable program code for enumerating at least one maximal clique from the graph provided that at least one maximal clique exists above the user-specified minimum size restriction.

14. The computer program product of claim 13, wherein the computer readable program code for filtering the data comprises computer readable program code for using degree-based filtering while loading less than an entire graph in memory to reduce the graph in size.

15. The computer program product of claim 13, further comprising computer readable program code for attaching a taboo list to a candidate for each vertex that is chosen to not be retained in the candidate, wherein attaching a taboo list facilitates determining if a candidate cannot give rise to a maximal clique.

16. An apparatus for enumerating at least one maximal clique, comprising:
    a memory; and
    at least one processor coupled to said memory and operative to:
        obtain data, wherein the data comprises a graph;
        obtain a user-specified minimum size restriction on at least one maximal clique of interest in the graph;
        filter the data based on the user-specified minimum size restriction and an extent of overlap in one or more neighborhoods of two vertices joined by an edge to reduce graph size, wherein said filtering comprises counting a number of one or more nodes that are common in the one or more neighborhoods, and wherein if the number of such common neighbor nodes exceeds a specified number, retaining the edge, else discarding the edge; and enumerate at least one maximal clique from the graph provided that at least one maximal clique exists above the user-specified minimum size restriction.

17. The apparatus of claim 16, wherein in filtering the data, the at least one processor coupled to said memory is further operative to use degree-based filtering while loading less than an entire graph in memory to reduce the graph in size.

* * * * *